United States Patent
Strifler et al.

[11] 3,802,745
[45] Apr. 9, 1974

[54] BRAKE INSTALLATION ESPECIALLY FOR MOTOR VEHICLES

[75] Inventors: Paul Strifler, Dettingen; Klaus Drometer, Kemnat; Diether Scarpatetti, Leonberg, all of Germany

[73] Assignee: Daimler-Benz Aktiengesellschaft, Stuttgart-Unterturkheim, Germany

[22] Filed: Sept. 3, 1971

[21] Appl. No.: 177,756

[30] Foreign Application Priority Data
Sept. 4, 1970   Germany.......................... 2043840

[52] U.S. Cl. ................. 303/3, 303/20, 303/21 F, 303/22 R
[51] Int. Cl......... B60t 13/68, B60t 8/00, B60t 8/18
[58] Field of Search............ 188/3 R, 181, 195, 349; 303/3, 60, 7, 10, 20, 21, 22 R

[56] References Cited
UNITED STATES PATENTS
2,120,207   6/1938   Vouch et al. ...................... 303/3 X
3,048,976   8/1962   Grigsby et al...................... 303/7 X
3,350,142   10/1967  Schuman ................................ 303/7
3,507,542   4/1970   Cannella ........................ 188/3 R X
3,671,082   6/1972   Stevens............................ 303/20 X FOREIGN PATENTS OR APPLICATIONS
1,961,039   6/1971   Germany.......................... 303/21 P Primary Examiner—George E. A. Halvosa
Assistant Examiner—Stephen G. Kunin
Attorney, Agent, or Firm—Craig and Antonelli

[57] ABSTRACT

A brake installation, especially for motor vehicles, which includes at least one pressure reservoir supplied by a pump that is connected by way of at least one brake valve controlled by a brake pedal or the like with one or several brake cylinders; an electronic control apparatus is additionally provided which is connected with a signal transmitter indicating the position of the pedal or the like and which controls the brake valve or valves as a function of the indicated position of the brake pedal.

10 Claims, 1 Drawing Figure

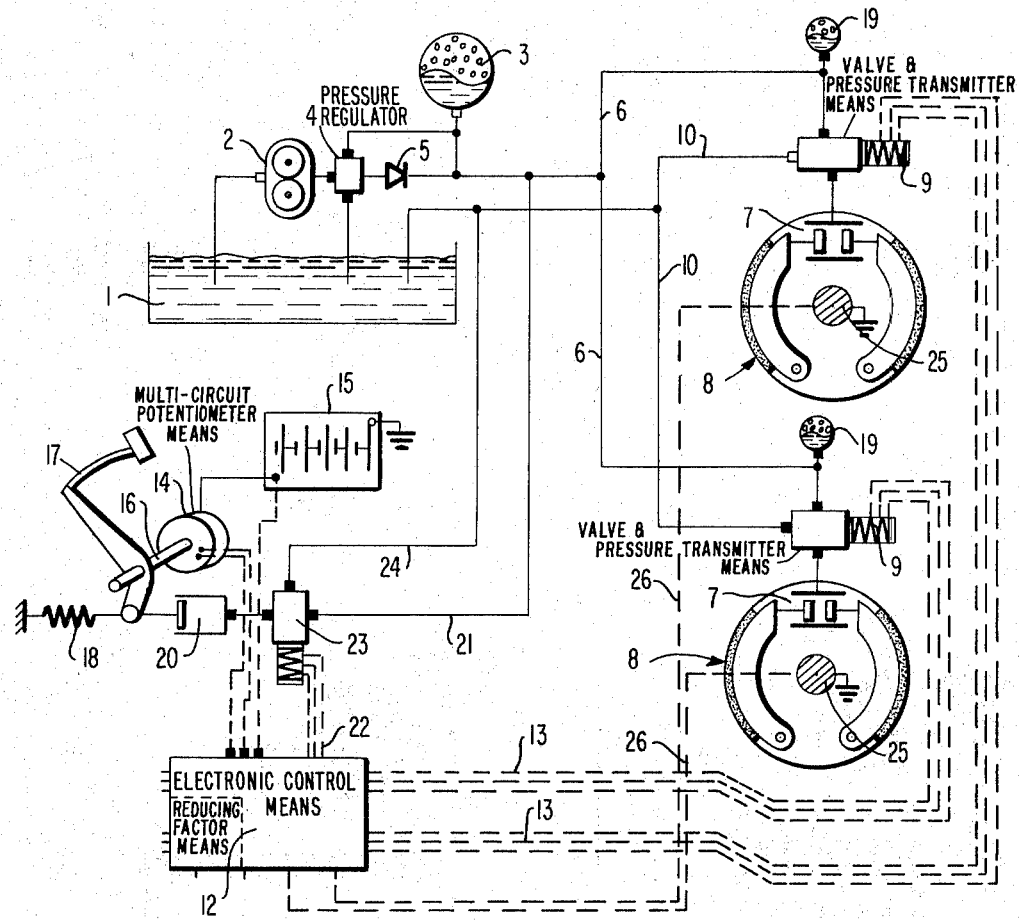

BRAKE INSTALLATION ESPECIALLY FOR MOTOR VEHICLES

The present invention relates to a brake installation, especially for motor vehicles, which includes at least one pressure reservoir charged by a pump, which is connected by way of at least one brake valve controlled by a brake pedal or the like with one of several brake cylinders.

The known hydraulic or pneumatic operating brakes, in which the brake valve is mechanically, pneumatically or hydraulically controlled, exhibit time losses or delays between the actuation and the instant the brakes become effective, due to deformations in the lines and the compressibility of the pressure medium.

The present invention is concerned with the task to provide a brake installation of the aforementioned type, in which the time delays are reduced. The present invention essentially consists in that an electronic control apparatus is provided which is connected with a signal transmitter indicating the position of the pedal or the like, and which controls the brake valve or valves dependent on the indicated position. The delay periods can be reduced to a minimum by this construction in accordance with the present invention.

In order to obtain a rapid feedback of the brake pressure adjusted in dependence on the pedal, provision is made according to a further feature of the present invention that the brake valve or valves are combined, preferably are constructed in one piece with the pressure transmitters detecting the pressure in the brake cylinder or cylinders, which are connected to the control apparatus.

An advantageous embodiment of the present invention is obtained if a brake valve is coordinated to each brake cylinder. It becomes possible thereby to check the brake effect of each brake cylinder independently of one another and eventually to control the same independently of one another. It is appropriate particularly for motor vehicles if the wheels to be braked or the like are equipped with one locking indicator each, which are connected to the electronic control apparatus that controls each brake valve by itself. The locking of individual wheels or of several wheels can be prevented with certainty by this construction of the present invention and the brake effect can be increased thereby.

In order to provide for the user of the brake, for example, for the driver of a motor vehicle, a feel as regards the magnitude of the applied brake force, according to a further feature of the present invention a reaction piston is connected with the brake pedal or the like which is connected with the pressure reservoir by way of the valve that is controlled by the electronic control apparatus.

A structurally appropriate embodiment of the present invention is obtained if a potentiometer adjustable in unison with the brake pedal or the like and preferably constructed as conventional two-circuit or multi-circuit potentiometers, is connected with the control apparatus. The safety is increased by the two-circuit or multi-circuit construction. Electromagnetically actuated brake valves may be coordinated to or associated with the brake cylinder or cylinders in a structurally simple manner.

By the construction of a brake installation according to the present invention, it becomes possible according to a further embodiment of the present invention to construct in motor vehicles all wheel brake cylinders of the same size and to incorporate into the electronic control apparatus a controllable reducing factor for an axle brake circuit, preferably operable as a function of the load. This construction means a considerable structural simplification in the manufacture and also a considerable simplification in storing spare parts.

According to a further feature of the present invention, the pressure reservoir is designed and constructed for a pressure lying considerably above the maximum pressure of the brake cylinder or brake cylinders. In the known types of construction, the pressure of the pressure reservoir is generally designed for the maximum pressure of the brake cylinder so that in case of a full braking the pressure in the brake cylinders approaches the maximum value only asymptotically. In contradistinction thereto, a very rapid attaining of the maximum pressure of the brake cylinders can be realized by the construction according to the present invention.

Accordingly, it is an object of the present invention to provide a brake installation, especially for motor vehicles, which avoids by simple means the aforementioned shortcomings and drawbacks encountered in the prior art systems.

Another object of the present invention resides in a brake installation, especially for motor vehicles, in which the time delays between actuation and effectiveness of the brakes is reduced to a minimum.

A further object of the present invention resides in a brake installation of the type described above which is simple in construction, easy to assemble and requires a minimum of different spare parts for servicing the brakes.

Still another object of the present invention resides in a brake installation especially for motor vehicles which permits an increase in the brake effect of the brake system by preventing the locking of individual or several wheels, and which provides a feel for the driver as regards the magnitude of the applied brake force.

Another object of the present invention resides in a brake installation for motor vehicles which considerably increases the safety of the brake system while permitting a rapid realization of the maximum pressure in the brake cylinders.

These and other objects, features and advantages of the present invention will become more apparent from the following description when taken in connection with the accompanying drawing which shows, for purposes of illustration only, one embodiment in accordance with the present invention, and wherein The single FIGURE is a schematic view of one embodiment of a brake installation for motor vehicles in accordance with the present invention.

Referring now to the single FIGURE of the drawing, the electronically controlled brake installation illustrated schematically in this view is constructed as pump reservoir brake installation. A central pressure reservoir 3 is supplied and charged from an oil reservoir 1 by way of a high pressure pump 2 which, for example, may be constructed as gear pump. The pressure reservoir or tank 3 is of conventional construction and includes a diaphragm separating a gas space from the pressure oil space. In order to match the average pump output to the oil consumption, a pressure regulator 4 of conventional construction and a check valve 5 are coordinated to the pressure reservoir 3. The pressure reservoir 3 is connected by way of high pressure lines 6 with the wheel brake cylinders 7 of two drum brakes generally designated by reference numeral 8. One electromagnetically actuated brake valve 9 each is arranged in the high pressure lines 6 directly upstream of the wheel brake cylinders 7. The brake valve 9 connects in the energized or operated shifting position thereof the pressure reservoir 3 by way of the high pressure lines 6 with the respective wheel brake cylinder 7 and in the de-energized or non-operated shifting position the wheel brake cylinder 7 by way of return lines 10 with the oil reservoir 1. Since such brake valves 9 are of conventional construction, known as such, a detailed description thereof is dispensed with herein.

The brake valves 9 are controlled by an electronic control apparatus 12, also of conventional construction, which is connected with the brake valves 9 by way of the electric lines 13 indicated in dash lines. The electronic control apparatus 12 is connected with a battery 15 by way of a preferably multi-circuit potentiometer 14, whereby in motor vehicles the normal motor vehicle battery may be used as the battery 15. The potentiometer 14 is adjustable by a shaft 16 which is rotated upon the actuation of a brake pedal 17 mounted thereon for rotation in unison therewith. The brake pedal 17 is retained in its rest position by a spring 18. Additionally, a local pressure reservoir or tank 19 is coordinated to each brake 8, which are connected to the high pressure lines 6.

Upon actuation of the brake pedal 17, the position thereof is transmitted by the potentiometer 14 to the electronic control apparatus 12 in a conventional manner. Furthermore, the electronic control apparatus 12 which consists of conventional circuits such as, for example, conventional logic circuits thereupon controls the electromagnetically actuated brake valves 9 in a manner, known as such, so that pressure oil from the pressure reservoirs 3 and 19 can reach the wheel brake cylinders 7. The pressure prevailing in each case in the wheel brake cylinders 7 is fed back by a pressure transmitter, of conventional construction, and, therefore, not shown in detail which is constructed integral with the brake valve 9, to the control apparatus 12 which, upon reaching the pressure corresponding to the pedal position closes off the oil supply from the pressure reservoirs 3 and 19. Upon the release of the brake, i.e., by releasing the brake pedal 17, the brake valves 9 are so controlled that the pressure oil can flow back by way of the return lines 10 out of the wheel brake cylinders 7 to the oil reservoir 1. The control of the brake valves 9 takes place with extraordinarily slight delays in time. In order to assure that the maximum pressure is reached in the shortest possible time in the wheel brake cylinders 7 after opening the brake valves 9, the pressure reservoirs 3 and 19 are designed for a pressure that is considerably above the maximum pressure of the wheel brake cylinders 7. As a result thereof, the pressure is very rapidly transmitted during braking. One also obtains the advantage that one is completely independent and free in the design of the actuating path. Consequently, any desirable force and path characteristics are possible independently of one another.

In order to enable for the person actuating the brake installation a control over the exerted brake force, the return spring 18 may be so constructed and designed that it will give to the driver of a motor vehicle a feel for the magnitude of the controlled brake pressure. However, it is more appropriate if, as illustrated in the given embodiment, a reaction piston 20 is coordinated to the brake pedal 17 which is acted upon directly from the pressure reservoir 3 by way of a high pressure line 21 with a pressure corresponding to the brake pressure. A valve is connected upstream of the reaction piston 20 which corresponds to the brake valves 9 and is connected with the electronic control apparatus 12 by way of a line 22; the valve 23 is additionally operable to connect the reaction piston 20 with the oil reservoir 1 by way of a return line 24. The valve 23 is controlled simultaneously and in the same manner as the brake valves 9 so that the brake pressure prevailing in the wheel brake cylinders 7 acts directly on the reaction piston 20.

In the illustrated embodiment each brake 8 is additionally equipped with a locking indicator 25 of conventional construction and, therefore, not illustrated in detail herein, which transmits in case of a locking a signal to the electronic control apparatus 12 by way of a line 26. In this case, the brake pressure is reduced by changing the position of the respective brake valve 9 by way of the electronic control apparatus 12 as a function of the locking signal so that the locking is effectively eliminated. This can be achieved, for example, by providing a so-called three-point control which is known as such in the art and which at first closes the high pressure line from the pressure reservoir, and thereupon, opens the discharge line, and thereafter, again closes the discharge line and opens the high pressure line when the locking of the wheel is eliminated.

If one dispenses with a locking protection installation, then of course, also the number of brake valves 9 can be reduced. Provision may be made that only one brake valve is then provided for each axle of the vehicle, which is connected with the high pressure line 6 and simultaneously with the two wheel brake cylinders 7 of an axle. Under these circumstances also the additional local pressure reservoirs 19 may be dispensed with.

It is additionally possible with the brake installation according to the present invention to provide wheel brake cylinders 7 of the same size for the front axle and for the rear axle and to incorporate by conventional, known means a reducing factor in the electronic control circuit for an axle brake circuit which controls the brake force distribution. This reducing factor may be constant; however, in most cases it will be appropriate if this reducing factor is controlled automatically and as a function of the load so that the brake force distribution can be matched to the respective requirements. Since such brake force distributions systems are known as such and form no part of the present invention, a detailed description thereof is dispensed with herein.

While we have shown and described only one embodiment in accordance with the present invention, it is understood that the same is not limited thereto but is susceptible of numerous changes and modifications as known to those skilled in the art and we, therefore, do not wish to be limited to the details shown and described herein but intend to cover all such changes and modifications as are encompassed by the scope of the appended claims.

What we claim is:

1. A brake installation for motor vehicles, which includes at least one pressure reservoir means charged by a pump, and in which a pressure reservoir of the pressure reservoir means is operatively connected with at least one brake cylinder means of a brakeable wheel of the motor vehicle by way of a brake valve means controlled by a brake actuating member to directly supply fluid medium to the brake cylinder means, characterized in that an electronic control means is provided which is operatively connected with a position indicating transmitter means transmitting the position of the brake actuating member, connecting means operatively connecting the electronic control means with the brake valve means for controlling the brake valve means in dependence on the indicated position of the brake actuating member, one brake valve means being coordinated to each brake cylinder means of a wheel of the motor vehicle, and each brake valve means including an electromagnetically operated valve and a pressure transmitter means integral therewith, said pressure transmitter means detecting the pressure in the associated brake cylinder means and providing an output indicative of the pressure in the brake cylinder means to the electronic control means for providing independent control of each electromagnetically operated brake valve.

2. A brake installation, especially for motor vehicles, which includes at least one pressure reservoir means charged by a pump, and in which the pressure reservoir means is operatively connected with at least one brake cylinder means by way of a brake valve means controlled by a brake actuating member, characterized in that an electronic control means is provided which is operatively connected with a position indicating transmitter means transmitting the position of the brake actuating member, connecting means operatively connecting the electronic control means with the brake valve means for controlling the brake valve means in dependence on the indicated position of the brake actuating member, one brake valve means being coordinated to each brake cylinder means, each brake valve means being combined with a pressure transmitter means detecting the pressure in the brake cylinder means, said pressure transmitter means providing an output indicative of the pressure in the brake cylinder means to the electronic control means and reaction piston means being operatively connected with the brake actuating member for opposing the actuating movement thereof, said reaction piston means being operatively connected with the pressure reservoir means by way of a valve means which is controlled by the electronic control means, said valve means in response to the electronic control means applying pressure means from the pressure reservoir means to the reaction piston means such that the reaction piston means opposes the actuating movement of the brake actuating member with a force corresponding to the applied brake force.

3. A brake installation, especially for motor vehicles, which includes at least one pressure reservoir means charged by a pump, and in which the pressure reservoir means is operatively connected with at least one brake cylinder means by way of a brake valve means controlled by a brake actuating member, characterized in that an electronic control means is provided which is operatively connected with a position indicating transmitter means transmitting the position of the brake actuating member, connecting means operatively connecting the electronic control means with the brake valve means for controlling the brake valve means in dependence on the indicated position of the brake actuating member, and reaction piston means operatively connected with the brake actuating member for opposing the actuating movement thereof, said reaction piston means being operatively connected with the pressure reservoir means by way of a valve means controlled by the electronic control means, said valve means being responsive to the electronic control means for applying pressure means from the pressure reservoir means to the reaction piston means such that the reaction piston means opposes the actuating movement of the brake actuating member with a force corresponding to the applied brake force.

4. A brake installation according to claim 3, characterized in that the position indicating transmitter means includes a potentiometer means adjustable by the brake actuating member and operatively connected with the electronic control means.

5. A brake installation according to claim 4, characterized in that the potentiometer means is constructed as two-circuit potentiometer.

6. A brake installation according to claim 4, characterized in that the potentiometer means is constructed as multi-circuit potentiometer.

7. A brake installation according to claim 3, characterized in that electronic magnetically actuated brake valve means are coordinated to the brake cylinder means.

8. A brake installation according to claim 3, characterized in that in a motor vehicle all wheel brake cylinder means are constructed of the same size.

9. A brake installation according to claim 3, characterized in that the pressure reservoir means is designed for a pressure which lies considerably above the maximum pressure of the brake cylinder means.

10. A brake installation according to claim 3, characterized in that the installation includes several brake cylinder means each provided with a brake valve means operatively connecting the pressure reservoir means with the respective brake cylinder means.

* * * * *